United States Patent

Shaw

[15] 3,638,640
[45] Feb. 1, 1972

[54] OXIMETER AND METHOD FOR IN VIVO DETERMINATION OF OXYGEN SATURATION IN BLOOD USING THREE OR MORE DIFFERENT WAVELENGTHS

[72] Inventor: Robert F. Shaw, 2316 Leavenworth St., San Francisco, Calif. 94133

[22] Filed: Nov. 1, 1967

[21] Appl. No.: 679,920

[52] U.S. Cl. .............................................. 128/2 R, 356/41
[51] Int. Cl. ........................................................ A61b 5/00
[58] Field of Search ....................... 128/2, 2.1, 2.05 D, 2.05 F, 128/2.05 M, 2.05 P, 2.05 PR; 356/39–41, 176–178, 180, 181, 186, 206

[56] References Cited

UNITED STATES PATENTS

| | | | |
|---|---|---|---|
| 2,423,855 | 7/1947 | Smaller | 356/41 |
| 2,640,389 | 6/1953 | Liston | 128/2 UX |
| 3,177,757 | 4/1965 | Polanyi | 356/41 |
| 3,314,327 | 4/1967 | Killpatrick et al. | 356/176 X |
| 2,910,909 | 11/1959 | Stone et al. | 356/176 |
| 3,040,737 | 6/1962 | Kompelien et al. | 128/2.05 P |
| 3,136,310 | 6/1964 | Meltzer | 128/2 |

Primary Examiner—William E. Kamm
Attorney—A. C. Smith

[57] ABSTRACT

Oximeter method and apparatus uses a test appliance that includes a source for directing radiation into skin tissue or other blood-confining container at three or more wavelengths and a detector for sensing the radiation intensity emanating from the skin tissue or other container at each wavelength. The oximeter method and apparatus also uses circuitry for combining the detector outputs in a predetermined manner to provide an indication of the oxygen saturation of the blood independently of position or movement of the test appliance on the patient and without first calibrating the indication on each patient.

36 Claims, 5 Drawing Figures

INVENTOR
ROBERT F. SHAW
BY  A. C. Smith
ATTORNEY

OXIMETER AND METHOD FOR IN VIVO DETERMINATION OF OXYGEN SATURATION IN BLOOD USING THREE OR MORE DIFFERENT WAVELENGTHS

BACKGROUND OF THE INVENTION

Certain known spectrophotometric instruments for determining concentrations of substances in a test sample by measuring radiation transmission through the sample at selected radiation wavelengths commonly require in effect that two radiation intensity measurements be performed at each of the selected wavelengths. The first intensity measurement is made in the absence of the test sample in order to determine the reference conditions which are established by such factors as the detector response of certain types of detectors, the geometry of illumination and detection, radiation attenuation by the optical system including the sample container, and the like. Of course, where reference conditions remain rigidly fixed and unchanged from sample to sample, the first intensity measurement need not be made for each test sample. The second intensity measurement at the same wavelength is made in the presence of the test sample and the difference between the two measurements is representative of radiation transmission through the sample at the selected wavelength. Thus, the concentration of a selected substance in the test sample may be determined from the two radiation intensity measurements performed at the selected wavelength in accordance with the Beer's law relationship between radiation transmission through the sample at the selected wavelength and the concentration of a substance present in the sample. When it is desirable to determine the concentrations of several substances present in a test sample by this method, two intensity measurements, one in the absence of sample and one in the presence of sample, must be made at each of several different radiation wavelengths. Thus, conventional spectrophotometric techniques for determining the concentrations of each of $n$ different substances present in a test sample generally require a number $2n$ of radiation intensity measurements at $n$ number of different radiation wavelengths.

Special purpose spectrophotometers used for determining the concentration of oxyhemoglobin in whole blood in vivo conventionally operate on similar principles at two wavelengths and require that the skin tissue perfused by the blood under test be squeezed to exclude the blood and thereby provide the reference measurement conditions. Devices of this type are described in the literature (see, for example, U.S. Pat. No. 2,706,927 entitled Apparatus For Determining Percentage Oxygen-Saturation Of Blood, issued on Apr. 26, 1955 to Earl H. Wood). One disadvantage encountered with devices of this type is that the accuracy of the measurement of concentration of oxyhemoglobin is extremely poor because the measurement conditions with blood present in the skin tissue differ substantially from the "reference" conditions established by squeezing the skin tissue to exclude blood. Also, the measurement accuracy is destroyed by changes in the measurement conditions due, for example, to movement of the test appliance on the skin tissue, changes in the quantity of blood perfusing the skin tissue under test, and the like.

SUMMARY OF THE INVENTION

Accordingly, the present invention provides spectrophotometer apparatus which measures oxygen saturation of blood in vivo and which obviates the need for making said reference measurements. The present apparatus operates at a number of different wavelengths equal to at least one plus the number of wavelength-dependent, radiation-absorptive substances present in the test sample and requires only a single intensity measurement at each of the wavelengths to provide an indication of oxygen saturation of blood in vivo. Changes in measurement conditions due to movement of the test appliance, changes in the geometry of illumination and detection, changes in thickness and geometry of neutral density sample containers, changes in the quantity of blood perfusing the skin tissue, and the like, are accounted for by making simultaneous intensity measurements at each of the selected wavelengths. This provides a continuous indication of oxygen saturation of blood in vivo as the measurement conditions change from patient to patient or even on a given patient. Thus, in the illustrated embodiment of the present invention, radiation sources and detectors are disposed about the ear of a patient to measure the intensity of radiation passing therethrough at each of at least three different radiation wavelengths. The logarithms of the detector responses are combined linearly to yield an indication of oxygen saturation as the ratio of the concentration of oxyhemoglobin to the concentration of total hemoglobin present in the patient's ear.

BRIEF DESCRIPTION OF THE DRAWING

FIG. 3b is a plan view showing the arrangement of light sources about the detector aperture in the embodiment of FIG. 3a.

DESCRIPTION OF THE PREFERRED EMBODIMENT

Figure 1:
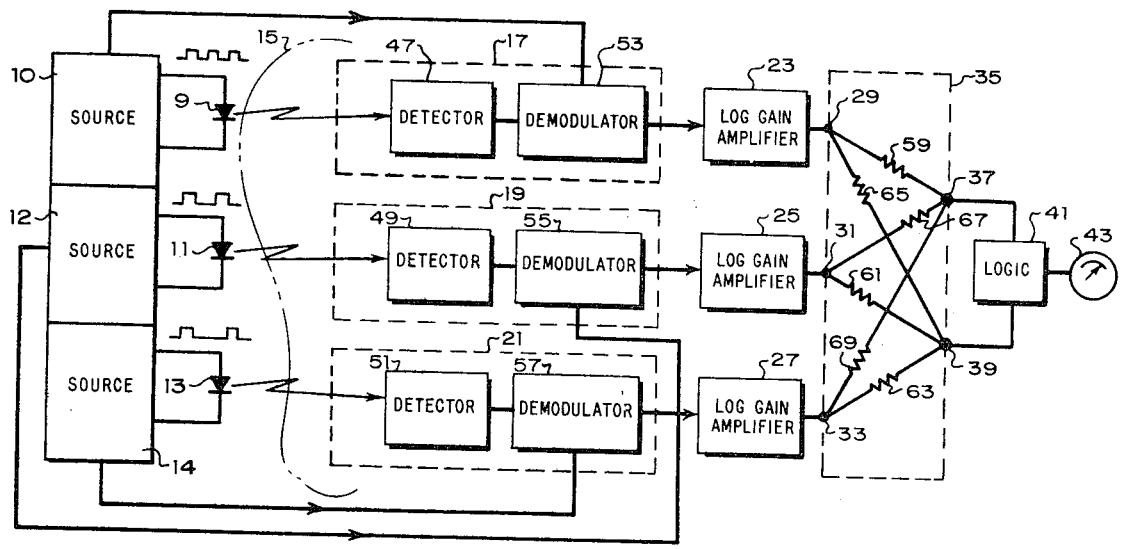
FIG. 1 is a schematic diagram of one embodiment of the oximeter apparatus of the present invention.
Figure 4:
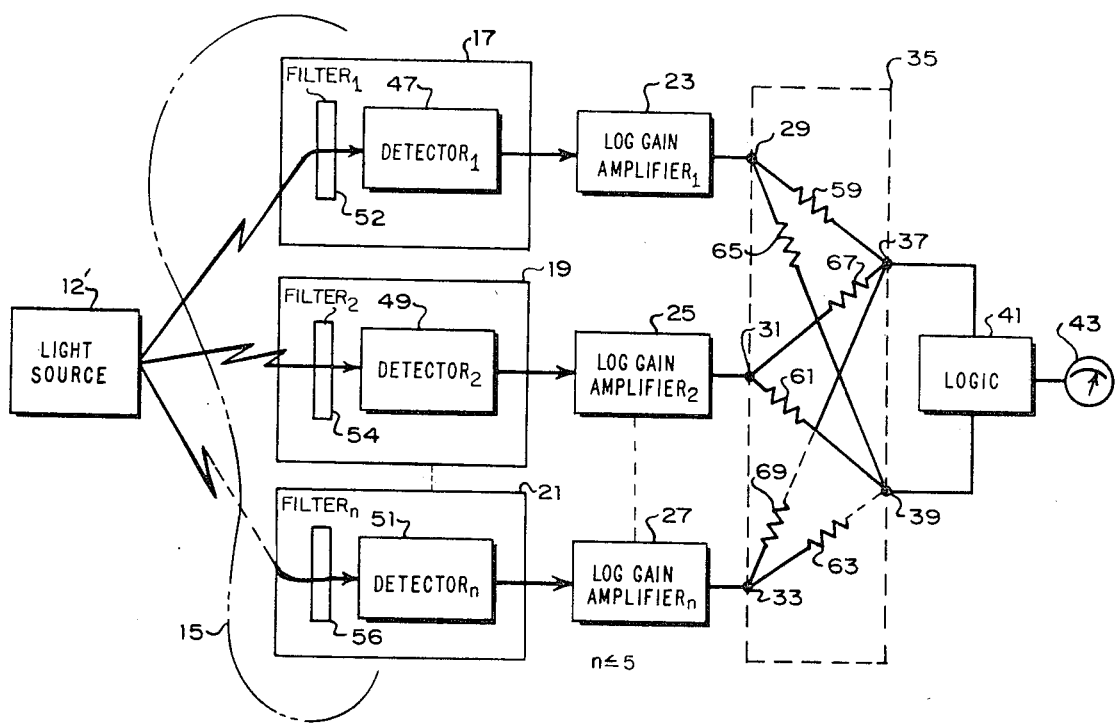
FIG. 4 is a schematic diagram of another embodiment of the oximeter apparatus of the present invention.

Referring to FIG. 1, there is shown a schematic diagram of one embodiment of the present oximeter apparatus which includes three semiconductor electroluminescent diodes 9, 11 and 13 arranged to irradiate substantially the same area of the ear 15 of a patient at at least three different narrow-band portions of the electromagnetic radiation spectrum, for example, about the 660, 715, and 805 millimicron wavelengths. Each of the diodes is energized intermittently by its associated source 10, 12 and 14 at a selected repetition rate. The radiation transmitted through the ear 15 is detected within each of the different bands by the detector means 17, 19 and 21, each of which includes a photoresponsive detector 47, 49, or 51 such as a photodiode, phototransistor, photomultiplier tube, or the like. Each of these detectors is disposed to receive radiation from substantially the same area of the ear 15 and is connected to a synchronous demodulator 53, 55, or 57 which in turn is connected to one of the sources for synchronous operation at the repetition rate of the associated source 10, 12, or 14. The resulting output from each demodulator 53, 55, or 57 is thus representative of the radiation which passed through the ear 15 only at the radiation wavelength produced by the diode that is energized in synchronism with the associated demodulator. A very narrow-band radiation-selective optical system is thus provided at the three radiation wavelengths produced by each of the diodes 9, 11 and 13. Of course, a single detector means may be used and its responses to radiation at three different wavelengths may be separated out by synchronous demodulation at each of the frequencies of excitation from sources 10, 12 and 14 or by time-shared sequential operation of each of the diodes 9, 11 and 13. Also, the diode light sources 9, 11 and 13 may be operated continuously to produce three selected radiation wavelengths or an incandescent light source may be used to provide a broad spectrum of radiation. In these cases, the synchronous demodulators 53, 55 and 57 would be eliminated, and in these cases, the detector means 17, 19 and 21 would include filters 52, 54 and 56 in the field of view of the detectors 47, 49 and 51 to provide the required response to radiation at at least three different wavelengths, as shown in FIG. 4.

The signals from the demodulators 53, 55 and 57 are amplified by amplifiers 23, 25 and 27 which have logarithmic output vs. input signal amplitude characteristics to provide signals at the output terminals 29, 31 and 33 which are representative of the logarithms of the total radiation received from the ear 15 at each of the three different radiation wavelengths. These three signals contain the information necessary to determine within tolerable limits of accuracy the ratio of the concentrations of the two wavelength-dependent, radiation-absorbing substances oxyhemoglobin and reduced hemoglobin where these substances are substantially the only wavelength-dependent, radiation-absorbing substances present in the test sample of blood and its container. However, where other wavelength-dependent, radiation-absorbing substances are significantly present, such as skin pigments or colored materials in the blood, then as discussed above, the number of wavelengths required will increase to one plus the number of such significant wavelength-dependent, radiation-absorbing substances present.

In order to determine oxygen saturation, it is not necessary to determine the concentrations of each of the significant wavelength-dependent, radiation-absorbing substances present, since it is only necessary to know the ratio of the concentration of oxyhemoglobin to the concentration of total hemoglobin present in the patient's ear. Thus in the embodiment shown, the three logarithmic signals at the output terminals 29, 31 and 33 may be combined linearly using resistors 59, 67 and 69 to produce a signal at terminal 37 which is indicative of the concentration of oxyhemoglobin and, further, may be combined linearly using resistors 65, 61 and 63 to produce a signal at terminal 39 which is indicative of the concentration of total hemoglobin. Logic circuit 41 connected to the terminals 37 and 39 thus combines these signals as the ratio of the signal on terminal 37 to the signal on terminal 39 for producing an indication on meter 43 of the percent oxygen saturation of blood in the patient's ear. The relative gain of the detectors and the values of the resistors 59–69 may be set initially by conducting actual tests on ear tissue-containing blood at various known values of oxygen saturation and by computing the resistor values required to produce meter indications from the logarithmic outputs 29, 31 and 33 which correspond to the known values of oxygen saturation. Thereafter, the meter 43 provides an accurate indication of percent oxygen saturation of blood in the ear 15 of a patient simply upon attachment to the ear 15 of a test appliance which includes the radiation sources 10, 12 and 14 and the detectors 47, 49 and 51. Thus, by continuously combining the logarithms of the radiation transmissions through blood in the patient's ear 15 at least three wavelengths, the Beer's law relationship between radiation absorption and the concentration of oxyhemoglobin present in the total concentration of hemoglobin is determined under all test conditions as they may vary from patient to patient or with movement of the test appliance on the ear of a particular patient.

It should be noted that true radiation absorption by the test sample is not being directly measured in the present invention because only the radiation emanating from the ear 15 in the presence of the sample is detected while the reference radiation (radiation emanating from the ear in the absence of the sample) is not detected. However, it can be shown that changes in the intensity of this reference radiation are taken into account by using one wavelength in addition to the number of wavelengths that correspond to the number of wavelength-dependent, radiation-absorbing substances present since this additional wavelength compensates for changes in the geometry of illumination and detection, changes in attenuation by the sample container and changes of other neutral density factors present in the radiation transmission system containing the test sample of blood.

Figure 2:
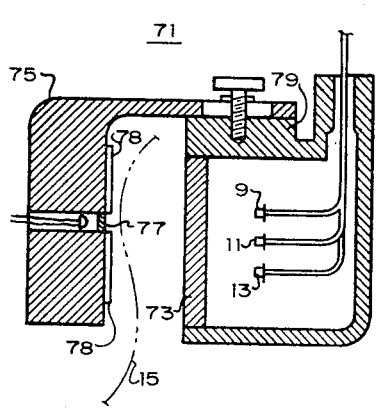
FIG. 2 is a sectional view of a preferred embodiment of a test appliance for use in the oximeter apparatus of FIG. 1.

It has been discovered that the relationship between the concentration of hemoglobin in whole blood and the absorption of radiation at a selected wavelength more closely follows Beer's law using $4\pi$ steradian illumination of the blood and tissue in the ear 15 and using only point area detection of the radiation emanating from the ear 15. In practice, however, these conditions may be realized with sufficiently accurate results using a test appliance 71 as shown in FIG. 2 which merely diffuses the radiation from a source such as the electroluminescent diodes 9, 11 and 13 over a relatively wide planar area, say about three-quarters of an inch in diameter and which uses one or more photoresponsive diodes 77 each having a small active area of a few square mils for detecting the radiation emanating from the ear 15. The preferred embodiment of a test appliance 71 as shown in FIG. 2 includes at least three electroluminescent diodes 9, 11 and 13 positioned behind a radiation-diffusing screen 73 which is disposed against one side of the ear 15. A clamp piece 75 supports a photoresponsive diode 77 and a mirror 78 in position on the opposite side of the ear 15 and is positioned on the base piece 79 to receive the ear 15 between the diffusing screen 73 and the detector diode 77. This single detector diode 77 thus responds to the radiation from a small surface area on the back side of the ear 15 and may be operated in synchronism with or in time-shared relationship to the operating rates of the electroluminescent diodes 9, 11 and 13, as previously described.

Figure 3A:
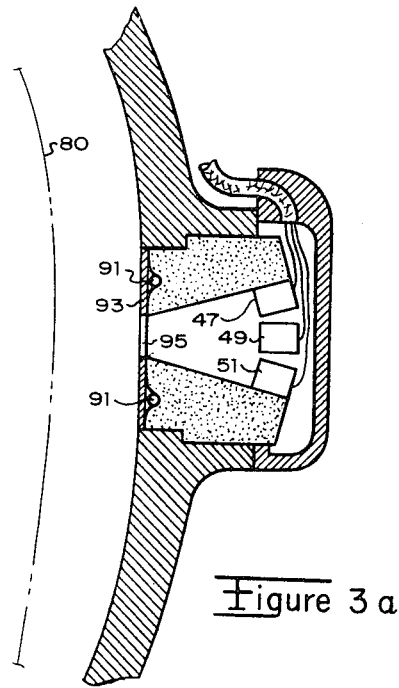
FIG. 3a is a sectional view of another embodiment of a test appliance for use in the oximeter apparatus of FIG. 1.
Figure 3B:
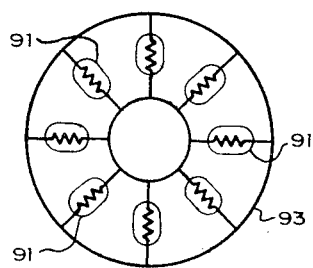

In another embodiment of the test appliance, as shown in the sectional side view of FIG. 3($a$) and the schematic front view of FIG. 3($b$), a selected body part 80, say, the forehead of a patient or other container of the blood sample is illuminated on the same side that the radiation is detected on. A wide-area diffused light source is provided by a plurality of light sources 91, either incandescent lamps or electroluminescent diodes, uniformly spaced behind an annular diffusing screen 93 surrounding a small-area detection aperture 95. Each of the three or more diode detector elements 47, 49 and 51 is disposed behind the aperture 95 to receive the radiation which emanates only from the selected body part 80 within a field of view that excludes both the radiation directly from the light source 91 and the reflected radiation from the surface of the selected body part 80. This assures that the diode detectors 47, 49 and 51 respond only to radiation which passed through the blood and skin tissue in the selected body part 80 of the patient. Thus, direct contact with the body part 80 by the radiation source and detector aperture is not essential as long as the field of view of the detectors 47, 49 and 51 does not include either the radiation directly from the light source or the mere reflected radiation from the surface of skin tissue or other container of the blood sample. The light sources 91 may thus be operated in the manner previously described in connection with the system of FIG. 1 to produce the three or more wavelength determination of percent oxygenation of blood. It should be noted that this arrangement of radiation sources and detectors does not provide true radiation transmission through the blood in skin tissue or other container, as required for the Beer's law relationship between concentration of a substance in solution and the radiation transmission through the solution at a selected radiation wavelength. However, in practice the skin tissue of the selected body part 80 and the blood contained therein scatter the radiation so that a small portion of the incident radiation emanates from the part 80 in the region adjacent the radiation source. This scattered radiation is suitably altered or modified by the radiation-absorbing substances in the skin tissue to permit detection and signal processing for producing an indication of percent oxygen saturation within tolerable limits of accuracy.

According to still another embodiment of the test appliance an incandescent light source is used for supplying radiation, either directly or through a light pipe, diffused over a relatively wide area to one side of the ear or other container. A fiberoptic light pipe is used for transmitting light emanating from a substantially smaller area on the other side of the ear or container to a single detector. A filter wheel including at least three sections each for passing a different wavelength of light is rotatably mounted between the light pipe and the detector and optionally between the light source and corresponding light pipe for sequentially passing at least three different wavelengths of light through the optical system including the blood sample to the detector. The detector output is switched in sequence with the filter sections to obtain at least three output signals that may be used as described above to produce the required determination of percent oxygenation of blood.

While the preferred embodiment is described above for use in making measurements of oxygen saturation of blood in vivo, it should be noted that the containers for the blood need not be restricted to the tissues of a subject, but may be cuvettes or other containers in which the blood may be present in either a hemolized or nonhemolized form. Also, it should be noted that the concentration of other wavelength-dependent, radiation-absorbing substances than oxyhemoglobin and total hemoglobin (for example, tracer dye) can be determined in accordance with the present invention. Further, the fluid containing the wavelength-dependent, radiation-absorbing substances need not be blood.

I claim:

1. Apparatus for determining the oxygen saturation of blood in the tissues of animal bodies in which variations occur in the optical measurement geometry and from which the blood cannot be removed for the purpose of making reference radiation intensity measurements, the apparatus comprising:

source means for producing electromagnetic radiation at at first, second and third radiation wavelengths and being disposed to supply incident radiation to the measurement site on the body at the plurality of wavelengths for producing output radiation from the body with intensities at the respective wavelengths that are altered from the incident intensities at such wavelengths by substantially the same conditions of the optical measurement geometry, the body and the blood present therein;

detector means for receiving said output radiation at each of said plurality of wavelengths for producing at least three electrical outputs which are representative only of the intensities of the output radiation at the respective wavelengths as altered from the corresponding incident intensities by the conditions of the optical measurement geometry, the body and the blood present therein at the measurement site; and circuit means connected to the detector means to receive the electrical outputs produced thereby in response to said output radiation for simultaneously combining all of said electrical outputs to produce therefrom an indication of the oxygen saturation of the blood present in the body at the measurement site substantially independently of changes in the optical measurement geometry.

2. Apparatus as in claim 1 comprising:

radiant-energy diffusing means interposed between said source means and the body for providing radiation thereto diffused over a given area of irradiation; and said detector means includes an aperture of area substantially smaller than said given area of diffused irradiation for receiving said output radiation therethrough from said body.

3. Apparatus as in claim 1 wherein:

said circuit means includes network means connected to receive said electrical outputs produced by said detector means for producing the logarithm of each of said electrical outputs and for linearly combining with selected weighting factors the logarithms of all of said electrical outputs to provide an output indicative of the oxygen saturation of blood in the body.

4. Apparatus as in claim 1 wherein variations occur in the concentration of a wavelength-dependent, radiation-absorbing substance present in the body tissue or the blood therein at the measurement site and wherein:

said source means of electromagnetic radiation provides radiation the body and blood contained therein at the measurement site at at least first, second, third and fourth radiation wavelengths; and said detector means receives said output radiation at each of said plurality of wavelengths for producing at least four electrical outputs which are representative only of the intensities of the output radiation at the respective radiation wavelengths with the substance and the blood present at the measurement site.

5. Apparatus as in claim 4 comprising:

radiant-energy diffusing means interposed between said source means and the body for providing radiation thereto diffused over a given area of irradiation; and said detector means includes an aperture of area substantially smaller than said given area of diffused irradiation for receiving said output radiation therethrough from said body.

6. Apparatus as in claim 4 wherein:

said circuit means includes network means connected to receive said electrical outputs produced by said detector means for producing the logarithm of each of said electrical outputs and for linearly combining with selected weighting factors the logarithms of all of said electrical outputs to provide an output indicative of the oxygen saturation of blood in the body.

7. Apparatus as in claim 4 wherein variations occur in the concentration of a wavelength-dependent, radiation-absorbing substance present in the tissue and also occur in the concentration of a wavelength-dependent, radiation-absorbing substance present in the blood within the body in addition to oxyhemoglobin and reduced hemoglobin and wherein:

said source means of electromagnetic radiation provides radiation to the body and blood contained therein at the measurement site at at least first, second, third, fourth and fifth radiation wavelengths; and said detector means receives said output radiation at each of said plurality of wavelengths for producing at least five electrical outputs which are representative only of the intensities of the output radiation at the respective radiation wavelengths with the substances and the blood present at the measurement site.

8. Apparatus as in claim 7 comprising:

radiant-energy diffusing means interposed between said source means and the body at said measurement site for providing said incident radiation to the body diffused over a given area of irradiation; and said detector means includes an aperture of area substantially smaller than said given area of diffused irradiation for receiving said output radiation therethrough from said body.

9. Apparatus as in claim 7 wherein:

said circuit means includes network means connected to receive said electrical outputs produced by said detector means for producing the logarithm of each of said electrical outputs and for linearly combining with selected weighting factors the logarithms of all of said electrical outputs to provide an output indicative of the oxygen saturation of blood in the body.

10. Apparatus as in claim 1 wherein said detector means is positioned with respect to said source means for receiving the output radiation from said body substantially only in the mode of radiation transmission through the body and the blood therein.

11. Apparatus as in claim 1 wherein said detector means is positioned with respect to said source means for receiving said output radiation from said body substantially only in the mode of radiation scattering back from the body and the blood therein.

12. Apparatus as in claim 1 wherein said circuit means includes:

a first network connected to the detector means for receiving said electrical outputs for simultaneously combining all of said electrical outputs produced by said detector means for producing a first output indicative of the quantity of oxyhemoglobin present in the blood at the measurement site;

a second network connected to the detector means for receiving said electrical outputs for simultaneously combining all of said electrical outputs produced by said detector means for producing a second output indicative of the total quantity of oxyhemoglobin and reduced hemoglobin present in the blood at the measurement site; and a third network connected to receive said first and second outputs for producing an output indication of oxygen saturation as the ratio of the first output to the second output.

13. Apparatus as in claim 12 wherein said detector means includes a gain-logarithmic amplifier for producing said electrical outputs, each indicative of the logarithm of the intensity of the output radiation received by the detector means at the respective one of the radiation wavelengths with blood present at the measurement site;

said first network includes means for linearly altering said electrical outputs by a first set of weighting factors and for simultaneously linearly combining all of the electrical outputs weighted by said first set of factors to produce said first output; and said second network includes means for linearly altering said electrical outputs by a second set of weighting factors and for simultaneously linearly combining all of the electrical outputs weight by said second set of factors to produce said second output.

14. Apparatus as in claim 12 comprising:

radiant-energy diffusing means interposed between said source means and the body at said measurement site for providing said incident radiation to the body diffused over a given area of irradiation; and said detector means includes an aperture of area substantially smaller than said given area of diffused irradiation for receiving said output radiation therethrough from said body.

15. Apparatus for determining the concentration of a selected wavelength-dependent, radiation-absorbing constituent present with other wavelength-dependent, radiation-absorbing constituents at measurement sites in animals bodies in which variations occur in the optical measurement geometry and from which such selected constituent cannot be excluded for the purpose of making reference radiation intensity measurements, the apparatus comprising:

source means for producing electromagnetic radiation at at least first, second and third radiation wavelengths and being disposed to supply incident radiation to the measurement site on the body at the plurality of wavelengths for producing output radiation from the body with intensities at the respective wavelengths that are altered from the incident intensities at such wavelengths by substantially the same conditions of the optical measurement geometry, the body and the wavelength-dependent, radiation-absorbing constituents present therein;

detector means for receiving said output radiation at each of said plurality of wavelengths for producing at least three electrical outputs which are representative only of the intensities of the output radiation at the respective wavelengths as altered from the corresponding incident intensities by the conditions of the optical measurement geometry, the body and the wavelength-dependent, radiation-absorbing constituents present therein at the measurement site; and circuit means connected to the detector means to receive the electrical outputs produced thereby in response to said output radiation for simultaneously combining all of said electrical outputs to produce therefrom an indication of the quantity of said selected constituent present in the body at the measurement site substantially independently of changes in the optical measurement geometry.

16. Apparatus as in claim 15 wherein:

said detector means is disposed with respect to said source means to receive said output radiation from the body substantially only in the mode of radiation transmission through the body.

17. Apparatus as in claim 15 wherein said detector means is positioned with respect to said source means for receiving said output radiation from the body substantially only in the mode of radiation scattered back from the body and the blood therein at the measurement site.

18. Apparatus as in claim 15 comprising:

radiant-energy diffusing means interposed between said source means and the body for providing said incident radiation to the body diffused over a given area of irradiation; and said detector means includes an aperture of area substantially smaller than said given area of diffused irradiation for receiving said output radiation therethrough from said body.

19. Apparatus as in claim 15 wherein:

said circuit means includes network means connected to receive said electrical outputs produced by said detector means for producing the logarithm of each of said electrical outputs and for linearly combining with selected weighting factors the logarithms of all of said electrical outputs to provide an output indicative of the quantity of said selected constituent.

20. Apparatus as in claim 15 wherein variations occur in the concentration of an additional wavelength-dependent, radiation-absorbing substance present in the body tissue or the blood therein at the measurement site and wherein:

said source means of electromagnetic radiation provides to the body containing the selected constituent at the measurement site at at least first, second, third and fourth radiation wavelengths; and said detector means receives said output radiation at each of said plurality of wavelengths for producing at least four electrical outputs which are representative only of the intensities of the output radiation at the respective radiation wavelengths in the presence of the substance at the measurement site.

21. Apparatus as in claim 20 comprising:

radiant-energy diffusing means interposed between said source means and the body for providing said incident radiation to the system diffused over a given area of irradiation; and said detector means includes an aperture of area substantially smaller than said given area of diffused irradiation for receiving said output radiation therethrough from said body.

22. Apparatus as in claim 20 wherein:

said circuit means includes network means connected to receive said electrical outputs produced by said detector means for producing the logarithm of each of said electrical outputs and for linearly combining with selected weighting factors the logarithms of all of said electrical outputs to provide an output indicative of the quantity of said selected constituent.

23. Apparatus as in claim 15 wherein variations occur in the concentration of a wavelength-dependent, radiation-absorbing substance present in the tissue, and also occur in the concentration of a wavelength-dependent, radiation-absorbing substance present in the blood within the body in addition to oxyhemoglobin and reduced hemoglobin, and wherein:

said source means of electromagnetic radiation provides radiation to the body containing the selected constituent at the measurement site at at least first, second, third, fourth and fifth radiation wavelengths; and said detector means receives said output radiation at each of said plurality of wavelengths for producing at least five electrical outputs which are representative only of the intensities of the output radiation at the respective radiation wavelengths in the presence of the tissue and blood substances at the measurement site.

24. Apparatus as in claim 23 comprising:

radiant-energy diffusing means interposed between said source means and the body at said measurement site for providing said incident radiation to the body diffused over a given area of irradiation; and said detector means includes an aperture of area substantially smaller than given area of diffused irradiation for receiving said output radiation therethrough from said body.

25. Apparatus as in claim 23 wherein:

said circuit means includes network means connected to receive said electrical outputs produced by said detector means for producing the logarithm of each of said electrical outputs and for linearly combining with selected weighting factors the logarithms of all of said electrical outputs to provide an output indicative of the quantity of said selected constituent.

26. Apparatus for determining the concentration of a wavelength-dependent, radiation-absorbing substance present in a system in which the optical geometry of measurement varies from system to system or within a given system, and the concentration of other wavelength-dependent, radiation-absorbing substances may vary from system to system or within a given system, and the substance of interest is not removed from the system for purposes of reference radiation intensity measurements of the system in the absence of the substances of interest, the apparatus comprising:

source means of electromagnetic radiation for supplying incident radiation to the system including the substance of interest at a total number of selected radiation wavelengths equal to at least one plus the number of wavelength-dependent, radiation-absorbing substances including the substance of interest which vary in concentration in the system under test for producing output radiation emanating from the system with intensities at the respective wavelengths that are altered from the incident intensities at such wavelengths by substantially the same conditions of the optical measurement geometry and the substances present in the system under test;

detector means for receiving said output radiation at each of said radiation wavelengths for producing a corresponding number of electrical outputs which are representative only of the intensities of the output radiation at the respective wavelengths as altered from the corresponding incident intensities by the conditions of the optical measurement geometry and the substances present in the system under test; and circuit means connected to the detector means to receive the electrical outputs produced thereby in response to said output radiation for simultaneously combining all of said electrical outputs to produce therefrom an indication of the concentration of said selected substance present in the system substantially independently of changes in the optical measurement geometry.

27. Apparatus as in claim 26 comprising:

radiant-energy diffusing means interposed between the source means and said system for providing said incident radiation to the system diffused over a given area of irradiation; and said detector means includes an aperture of area substantially smaller than said given area of diffused irradiation for receiving said output radiation therethrough from said system.

28. Apparatus as in claim 26 wherein:

said circuit means includes network means connected to receive said electrical outputs produced by said detector means for producing the logarithm of each of said electrical outputs and for linearly combining with selected weighting factors the logarithms of all of said electrical outputs to provide an output indicative of the concentration of said selected substance.

29. Apparatus as in claim 26 wherein:

said detector means is disposed with respect to said source means to receive the output radiation substantially only in the mode of radiation scattering back from said system.

30. Apparatus as in claim 26 wherein:

said detector means is positioned with respect to said source means for receiving the output radiation from the system under test substantially only in the mode of radiation transmission through the system.

31. Method of determining the concentration of a selected wavelength-dependent, radiation-absorbing constituent present with other wavelength-dependent, radiation-absorbing constituents in a multiconstituent system under test in which variations occur in the optical measurement geometry and from which the selected constituent is not excluded for the purpose of making reference radiation intensity measurements, the method comprising the steps of:

supplying incident electromagnetic radiation to the multiconstituent system at a total plural number of radiation wavelengths equal to at least one plus the number of wavelength-dependent, radiation-absorbing constituents which vary in concentration in the system under test for producing output radiation emanating from the system with intensities at the respective wavelengths that are altered from the incident intensities at such wavelengths by substantially the same conditions of the optical measurement geometry and the multiconstituent system;

producing a corresponding plural number of electrical outputs which are representative only of the intensities of the output radiation at the respective wavelengths as altered from the corresponding incident intensities by the conditions of the optical measurement geometry and the multiconstituent system under test; and simultaneously combining all of said electrical outputs produced in response to said output radiation for producing therefrom an indication of the quantity of said selected constituent present in the multiconstituent system substantially independently of changes in the optical measurement geometry.

32. Method of continuously indicating oxygen saturation of blood in the tissues of animal bodies in which variations occur in the optical measurement geometry and from which the blood cannot be removed for the purpose of making reference radiation intensity measurements, the method comprising the steps of:

supplying incident electromagnetic radiation to a measurement site on the body at at least first, second and third radiation wavelengths for producing output radiation emanating from the body with intensities at the respective wavelengths that are altered from the incident intensities at such wavelengths by substantially the same conditions of the optical measurement geometry, the body and blood present therein;

producing at least three electrical outputs which are representative only of the intensities of the output radiation at the respective wavelengths as altered from the corresponding incident intensities by the conditions of the optical measurement geometry, the body and the blood present therein at the measurement site; and simultaneously combining all of said electrical outputs produced in response to said output radiation for producing therefrom an indication of the oxygen saturation of the blood present in the body at the measurement site substantially independently of changes in the optical measurement geometry.

33. The method as in claim 32 wherein the step of combining the signals includes:

converting all the electrical outputs to logarithmic outputs;

forming a pair of indicator outputs, each as a selected simultaneous linear combination of all the logarithmic outputs; and producing the indication of oxygen saturation at the measurement site as the ratio of the pair of indicator outputs.

34. Method as in claim 50 wherein the step of supplying incident electromagnetic radiation includes supplying the radiation to the body diffused over a given area of irradiation; and in the step of producing said electrical outputs, the electrical outputs are formed in response only to the output radiation within an area substantially smaller than said given area of irradiation.

35. In the method as in claim 32 wherein variations occur in the concentration of wavelength-dependent, radiation-abosrbing substance present in the body tissue or the blood therein, the step of supplying incident electromagnetic radiation includes supplying such radiation at at least first, second, third and fourth radiation wavelengths for producing the output radiation emanating from the body with intensities at the respective wavelengths that are altered from the incident intensities at such wavelengths by substantially the same conditions of the optical measurement geometry, the body and the substance and blood present therein;

and the step of producing electrical outputs includes producing at least four electrical outputs which are representative only of the intensities of the output radiation at the respective wavelengths as altered from the corresponding incident intensities by the conditions of the optical measurement geometry, the body and the substance and blood present therein.

36. In the method of claim 32 wherein variations in the concentration of a wavelength-dependent, radiation-absorbing substance present in the body tissue and also occur in the concentration of a wavelength-dependent, radiation-absorbing substance present in the blood within the body in addition to oxyhemoglobin and reduced hemoglobin, the step of supplying incident electromagnetic radiation includes supplying such radiation at at least first, second, third, fourth and fifth radiation wavelengths for producing the output radiation emanating from the body with intensities at the respective wavelengths that are altered from the incident intensities at such wavelengths by substantially the same conditions of the optical measurement geometry, the body, blood and substances present therein;

and the stop of producing electrical outputs includes producing at least five electrical outputs which are representative only of the intensities of the output radiation at the respective wavelengths as altered from the corresponding incident intensities by the conditions of the optical measurement geometry, the body, blood and substances present therein.

* * * * *

UNITED STATES PATENT OFFICE
CERTIFICATE OF CORRECTION

Patent No. 3,638,640          Dated February 1, 1972

Inventor(s)  Robert F. Shaw

It is certified that error appears in the above-identified patent and that said Letters Patent are hereby corrected as shown below:

Column 3, line 34, "tissue-containing" should read -- tissue containing --; lines 44-45, "at least" should read -- at at least --;

Column 5, line 20, before "first" insert -- least --;

Column 7, line 19, "weight" should read -- weighted --;

Column 8, line 72, after "smaller than" insert -- said --;

Column 9, line 16, "substances" should read -- substance --;

Column 10, line 64, "50" should read -- 32 --;

Column 12, line 10, "stop" should read -- step --.

Signed and sealed this 15th day of August 1972.

(SEAL)
Attest:

EDWARD M.FLETCHER,JR.                ROBERT GOTTSCHALK
Attesting Officer                    Commissioner of Patents